United States Patent [19]

Morimoto et al.

[11] Patent Number: 5,251,196

[45] Date of Patent: Oct. 5, 1993

[54] OPTICAL PICK-UP SELECTIVELY READING AND WRITING AN OPTICAL AND MAGNETO-OPTICAL RECORDED MEDIUM

[75] Inventors: Yasuaki Morimoto; Friedhelm Zucker, both of Villingen-Schwenningen; Christian Büchler; Heinz-Jörg Schröder, both of Marbach, all of Fed. Rep. of Germany

[73] Assignee: Deutsche Thomson-Brandt GmbH, Hannover, Fed. Rep. of Germany

[21] Appl. No.: 826,676

[22] Filed: Jan. 27, 1992

Related U.S. Application Data

[63] Continuation of Ser. No. 250,732, Sep. 28, 1988, abandoned.

[30] Foreign Application Priority Data

Sep. 30, 1987 [DE] Fed. Rep. of Germany ....... 3732874

[51] Int. Cl.$^5$ ............................................. G11B 13/04
[52] U.S. Cl. ...................................... 369/110; 369/13; 360/114
[58] Field of Search ................ 369/13, 110, 112, 124, 369/116, 109; 360/114, 59

[56] References Cited

U.S. PATENT DOCUMENTS

| | | | |
|---|---|---|---|
| 4,730,289 | 3/1988 | Saitoh et al. ............................ | 369/13 |
| 4,783,776 | 11/1988 | Ishigaki et al. ....................... | 369/109 |
| 4,807,210 | 2/1989 | Kaku et al. ........................ | 369/109 X |
| 4,858,218 | 8/1989 | Takagi et al. ...................... | 369/13 X |
| 5,020,040 | 5/1991 | Lee ................................... | 360/59 X |

FOREIGN PATENT DOCUMENTS

| | | | |
|---|---|---|---|
| 2578083 | 8/1986 | France ................................. | 369/13 |
| 59-20258 | 11/1984 | Japan . | |
| 60-129954 | 7/1985 | Japan .................................. | 369/13 |

Primary Examiner—Hoa Nguyen
Attorney, Agent, or Firm—Max Fogiel

[57] ABSTRACT

An optical pick-up for selectively reading and writing an optical and magneto-optical recorded medium, in which light projected on the recorded medium is reflected therefrom and directed onto one of two photodetectors, depending on the polarization of the light. The recorded medium has magnetic domains for storing data and a magneto-optical signal is generated from the difference between the two photo voltages from the two photodetectors. The magneto-optical signal represents the data stored in the magnetic domains. The recorded medium also stores data in pit forms, and an optical signal is generated from the sum of the photovoltages of the two photodetectors, to represent the data stored in the pit forms. The arrangement is suitable for reading out simultaneously the optical signal and the magneto-optical signal.

4 Claims, 8 Drawing Sheets

OPTICAL PICK-UP SELECTIVELY READING AND WRITING AN OPTICAL AND MAGNETO-OPTICAL RECORDED MEDIUM

The present application is a continuation of the parent application Ser. No. 250,732 filed Sept. 28, 1988, now abandoned.

BACKGROUND OF THE INVENTION

The invention concerns an optical pick-up for reading and/or writing an optical recording medium and/or magneto-optical recording medium, whereby a source projects light on the medium and light reflected by the medium is diverted to one photodetector or another depending on how it is polarized.

The invention also concerns an optical pick-up for reading and/or writing an optical recording and/or magneto-optical recording medium, whereby a source projects light on the medium.

One known example of an optical recording medium is a compact disk, which has a transparent layer on top of a reflecting aluminum layer. The light-reflecting aluminum layer has depressions called "pits" that represent data stored on the disk. The data can be read from the compact disk by means of an optical pick-up because of the reflectivity of the light-reflecting aluminum layer depends on the pattern of the depressions in the disk. Less light is reflected from a depression, which is also often called a "groove," than from an elevation, which is often called "land."

From the intensity of the light reflected by the disk accordingly, the optical pick-up determines whether the bit being scanned is a logical one or a logical zero for example.

Another optical pick-up medium of this type, called an "optomagnetic disk," is described in the article "Magnetooptische Versuche dauern an" ["optomagnetic testing continues"] on pages 37 to 41 of Funkschau 13, 21 (June 1986).

A magneto-optical disk, in contrast to a conventional compact disk, has sometimes no pits. Below the transparent layer is a magnetic layer, in which data can be stored and from which they can be read out. How data can be written onto an optico-magnetic disk will now be described.

A laser beam focused on the disk heats the magnetic layer to above the Curie point. It is, however, usually sufficient to heat the layer to a compensation temperature that is just below the Curie point. An electromagnet is positioned behind the focus on the disk and magnetizes the area heated by the laser in one polarity or another. As the temperatures of the heated points drop below the Curie point again when the laser beam is turned off, the magnetic polarity established by the electromagnet remains in force. It "freezes in." The individual bits are in this way stored in domains of differing magnetic polarity, with one polarity for example representing a logical one and the other a logical zero.

The data can be read out by exploiting the Kerr effect. The plane of polarity of a linearly polarized beam of light is rotated through a measurable angle when reflected by a magnetized domain. Depending on the direction that the domain is magnetized in, the plane of polarization of the reflected beam will be rotated either left or right. Since, however, the recorded domains on the disk act like magnetized mirrors, the plane of polarization of a scanning beam of light will be rotated right or left to a measurable extent depending on the magnetic polarity of the domains being scanned at that instant.

From the rotation of the plane of polarization of the beam of light reflected from the disk the optical pick-up determines whether the bit is a logical one or a logical zero. In contrast to a compact disk, an optico-magnetic disk can be erased and rerecorded almost as often as desired.

One innovative new type of disk is a combination compact disk and optomagnetic disk. Data can be stored on this type of recording medium in both the magnetic domains and in pits forms.

SUMMARY OF THE INVENTION

The object of the invention is accordingly to provide an optical pick-up that will be appropriate for reading compact disks, optomagnetic disks, and the new combination disks.

One embodiment of the invention has the feature that a signal representing the data stored in the magnetic domains of the recording medium is obtained from the difference between the photovoltages of the two photodetectors and in that a signal that represents the data stored in the pit forms in the recording medium is obtained from the sum of the photovoltages of the photodetectors.

Another embodiment of the invention has the feature that the recording medium reflects some of the light onto one photodetector, at the output terminal of which the signal that represents the pit data in the recording medium can be obtained, and by the feature that some of the light emitted by the source penetrates the recording medium. In another feature the light that penetrates the medium is diverted in accordance with its polarity onto a second or onto a third photodetector by a polarizer behind the medium. The output terminals of the second and third photodetectors are connected to the input terminals of a differential amplifier, at the output terminal of which the signal that represents the data stored in the magnetic domains of the recording medium can be obtained.

DESCRIPTION OF THE PREFERRED EMBODIMENTS

Figure 1:
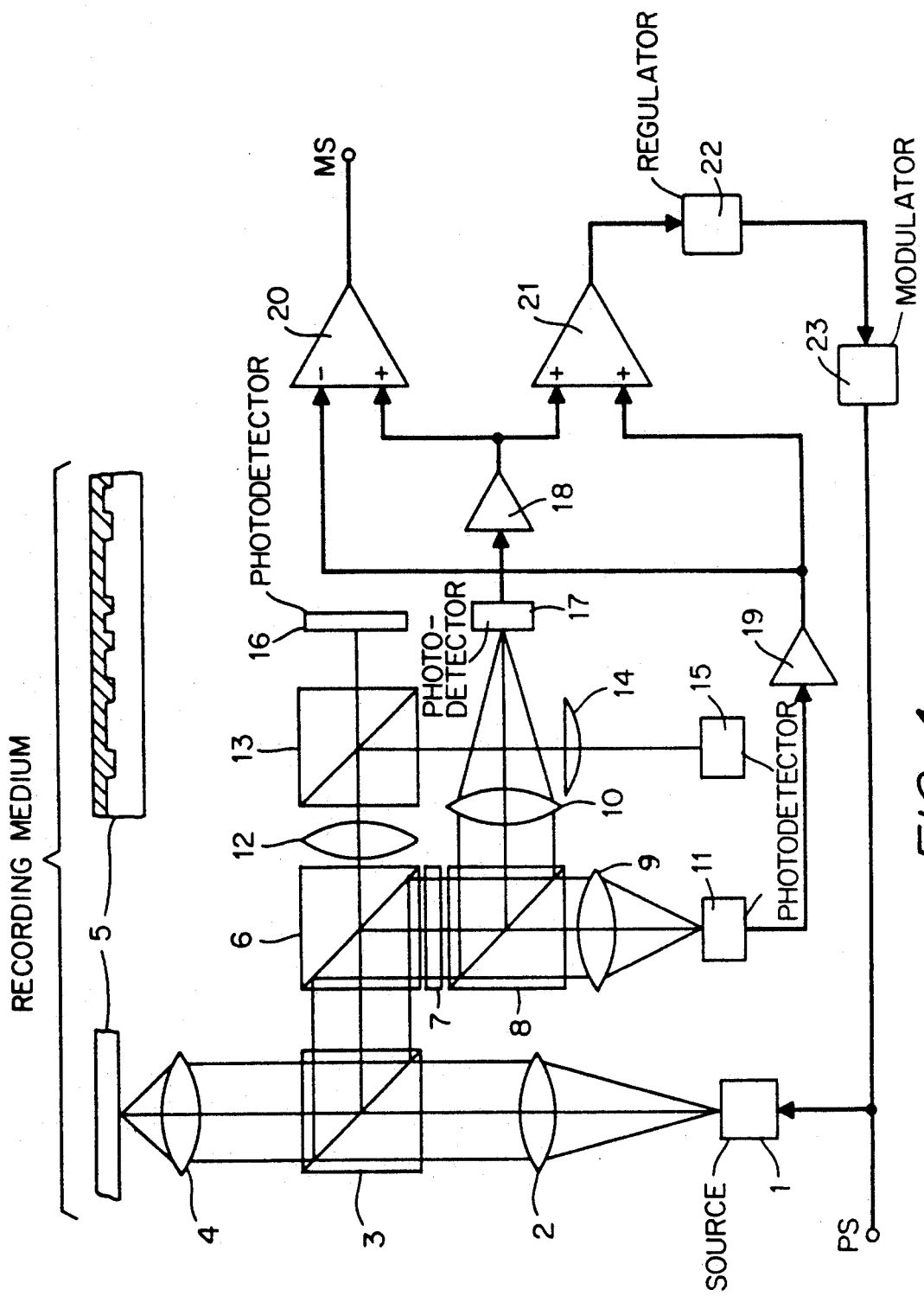
FIG. 1 illustrates schematically one embodiment of the invention.

The data-scanning beam of light illustrated in FIG. 1 is focused by a source 1, usually a laser, onto an innovative recording medium 5 by way of a lens 2, a prism beam divider 3, and another lens 4. The medium reflects the beam back to prism beam divider 3 through second lens 4. Prism beam divider 3 diverts the reflected beam of light at a right angle onto another prism beam divider 6. Just as it penetrates second prism beam divider 6, the beam of light travels through another lens 12 and strikes still another prism beam divider 13 that diverts a beam of light onto a photodetector 16 comprising for example two photodiodes E and F. A differential amplifier constructs a tracking error TE = ES − FS from the output signals ES and FS of photodiodes E and F in a way that is known in relation to three-beam optical pick-up. Third prism beam divider 13, however, also diverts a beam of light at a right angle through a fourth lens 14 and onto another photodetector 15 comprising for example four photodiodes A, B, C, and D. A focusing error FE = (AS + CS)(CS) − (CS + DS) is constructed from their output signals AS, BS, CS, and DS as is conventional with optical pick-ups.

Second prism beam divider 6, however, also diverts a beam of light at a right angle through a $\lambda/2$ disk 7 and onto a polarized-beam divider 8, which diverts the beam through a fifth lens 9 and onto photodetector 11 when its plane of polarization is rotated in one direction. When on the other hand its plane of polarization is rotated in the other direction, polarized-beam divider 8 diverts the beam through a sixth lens 10 and onto photodetector 17. The photovoltage from photodetector 11 is forwarded through an amplifier 19 to one input terminal of a summation amplifier 21 and to the subtracting input terminal of a differential amplifier 20. The photovoltage from photodetector 17 is forwarded through a third amplifier 18 to the second input terminal of summation amplifier 21 and to the adding input terminal of differential amplifier 20. The output terminal of differential amplifier 20 is connected by way of controls 22 to the input terminal of a modulator 23 that controls the light of laser 1.

The pits on the new type of recording medium 5 would cause the intensity of the reflected light to fluctuate constantly and detrimentally superimpose themselves on the data signal at the output terminal of differential amplifier 20. To prevent this overlapping, the intensity of the reflected light is maintained constant by modulator 23, which controls laser 1.

The signal MS that represents the data stored in the magnetic domains of the recorded medium can accordingly be obtained at the output terminal of differential amplifier 20. The data stored in the pit forms in the recording medium, however, are not lost. They are represented by the control signal from modulator 23. The signal PS that represents the data stored in the pit forms in the recording medium can accordingly be simultaneously obtained at the output terminal of modulator 23.

Figure 2:
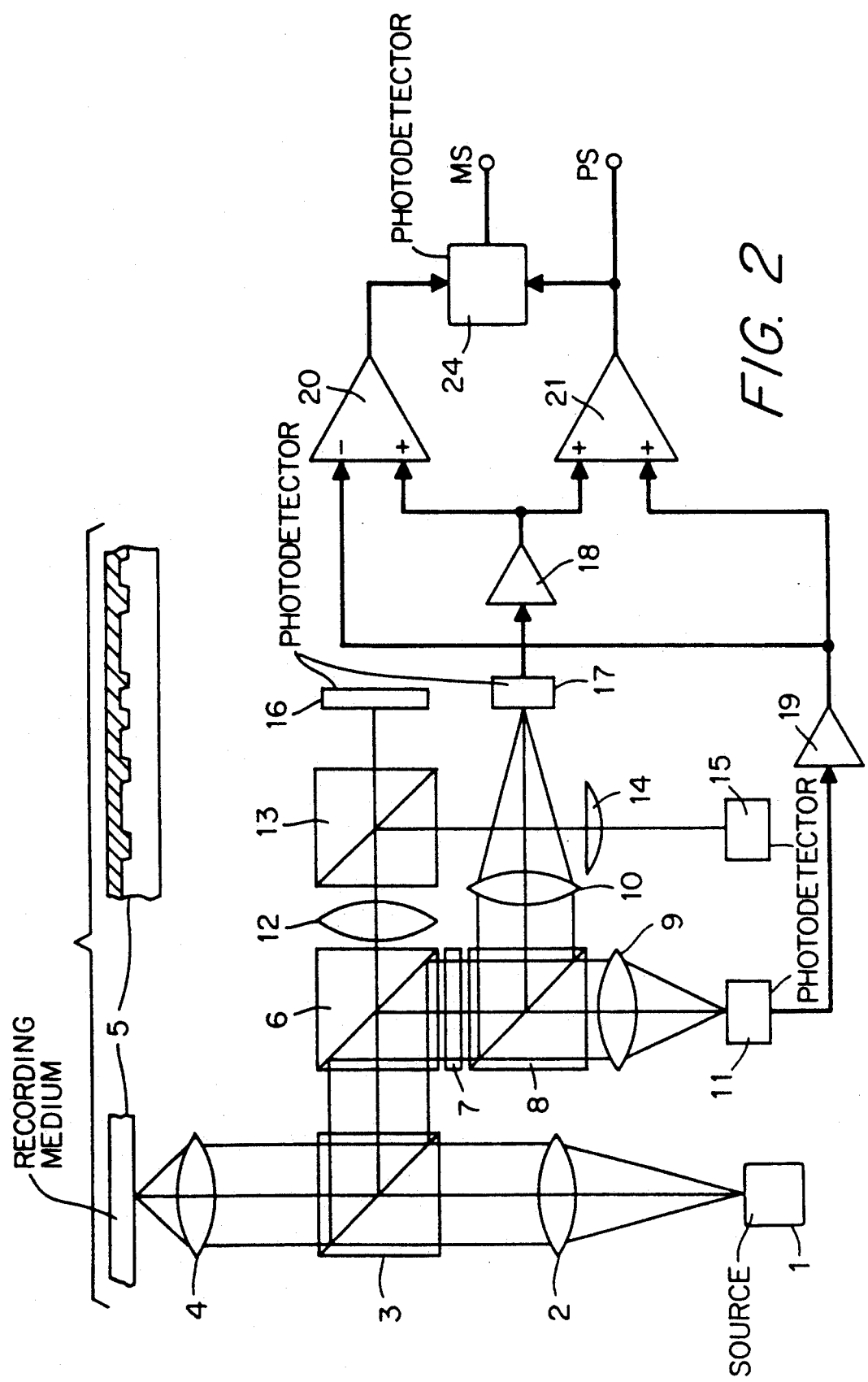
FIG. 2 illustrates schematically another embodiment of the invention.

The second embodiment, illustrated in FIG. 2 differs only slightly from the first. It has no controls 22 or modulator 23. Instead, the output terminal of summation amplifier 21 is connected to the input terminal of a divider 24, the other input terminal of which is connected to the output terminal of differential amplifier 20. Although the modulation product of the signal MS that represents the data stored in the magnetic domains of the recording medium and of the signal PS that represents the data stored in the pit forms in the recording medium is available at the output terminal of differential amplifier 20 in this embodiment, since that product is divided in divider 24 by signal PS, only signal MS is available at the output terminal of the divider. Simultaneously available at the output terminal of summation amplifier 21, however, is the other signal PS that represents the data stored in the pit forms in the recording medium.

If, for example, the pits on the new type of recording medium are not as deep as approximately $\frac{1}{4}$ of the wavelength $\lambda$ of the scanning beam of light, as is the case with compact disks, the power of the laser can be diminished. The recording medium is accordingly not heated to the same extent while it is being read and the margin of safety with respect to the Curie point is more extensive. It turns out to be practical for the pits to be about 1/10 as deep as the wavelength of the scanning beam of light because the modulation will be definitely lower.

Figure 3:
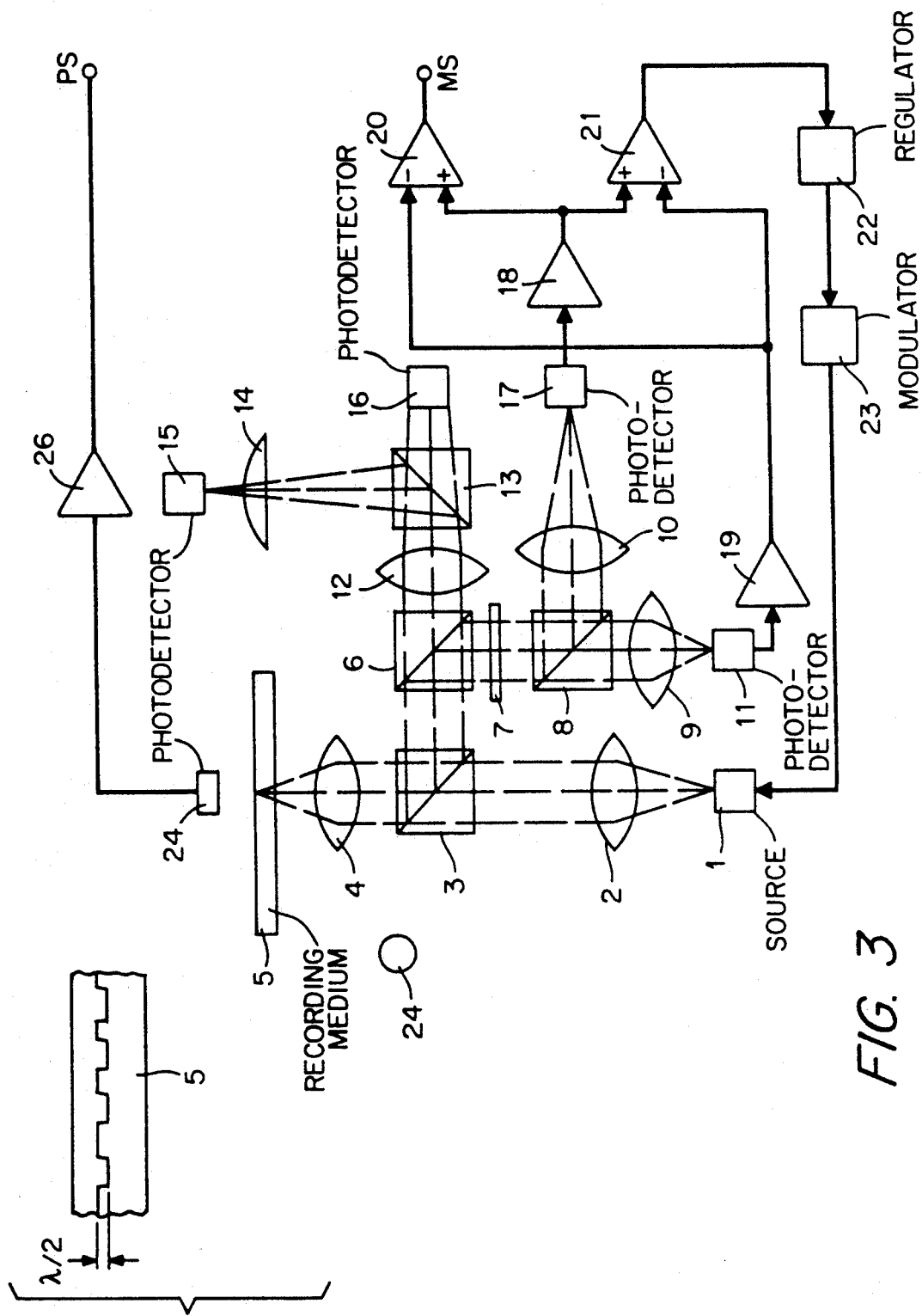
FIG. 3 illustrates schematically a third embodiment of the invention.
Figure 8:
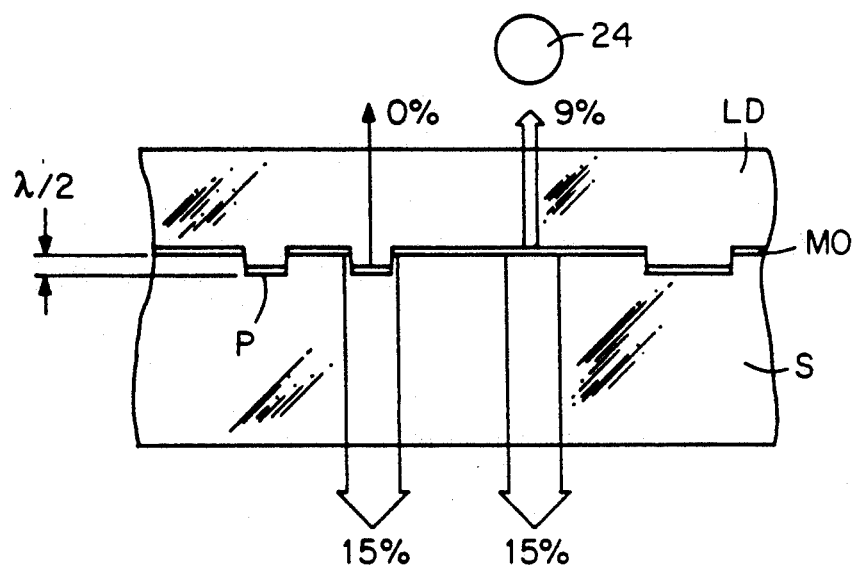
FIGS. 8 and 9 illustrate an innovative new optomagnetic recorded medium.
Figure 9:
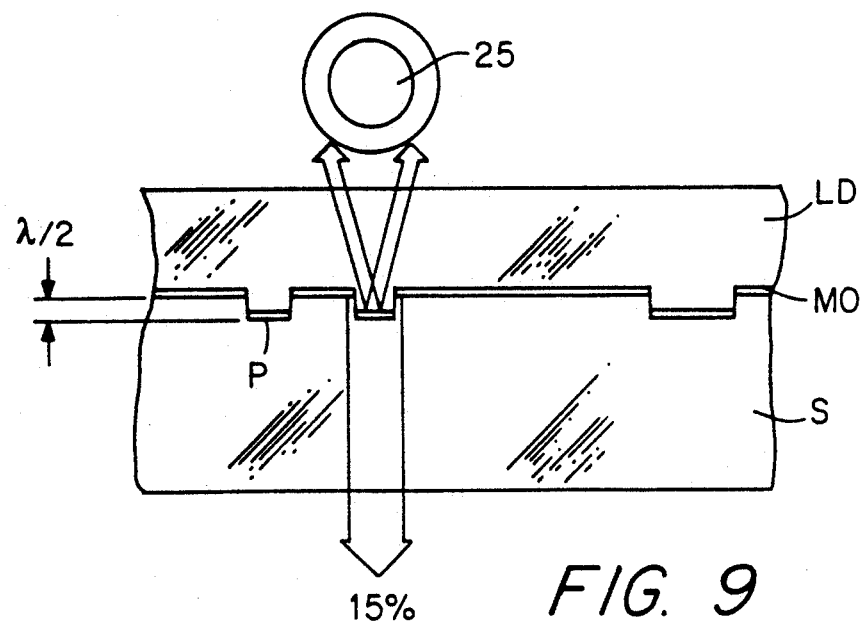

A third embodiment of the invention, appropriate for reading the new type of recording medium illustrated in FIGS. 8 and 9 will now be specified with reference to FIG. 3.

When the optomagnetic layer MO is approximately as thick as or thinner than the wavelength of the scanning beam of light, some of the light will penetrate it. FIG. 8 illustrates how approximately 9% of the incident light will penetrate when optomagnetic layer MO is $\lambda/2$ thick at the points where there are no depressions P, whereas approximately 15% is reflected. The rest is absorbed. Optomagnetic layer MO is protected from damage by a transparent layer LD with an index $n_1$ of refraction of 1. There is also another protective layer S.

FIG. 9 illustrates the distribution of light at a pit P, a depression, about half as deep as the wavelength of the scanning beam of light. Approximately 15% of the incident light is reflected back. When the depth of the pit is equal to $\lambda/2$, however, refraction patterns will occur behind the recording medium because, due to a path distance difference equal to $\lambda/6$, the components of the light that shine through a depression will interfere with the components that shine through the thicker layer around the depression. The path difference is the difference in distances traveled by light reflected from a land and from a depression and traveling to a pick-up. There is a transparent layer LD to protect optomagnetic layer MO from damage, scratches for example.

Since, with a pit depth equal to $\lambda/2$, the path difference between the light reflected from a land and from a depression is $\lambda/2 + \lambda/2 = \lambda$, the light reflected at optomagnetic layer MO and scanning the data stored in the magnetic domains of the recording medium will not be contaminated by the pattern of pits. The pit depth can also be an odd multiple of $\lambda/2$ instead of $\lambda/2$. All that is essential is that the path difference be $\lambda$ or a whole multiple thereof.

The embodiment illustrated in FIG. 3 differs from that illustrated in FIG. 1 in that it has a photodetector 24, in the shape of a circle for example, behind recording medium 5, with the output terminal of the photodetector connected to the input terminal of an amplifier 26.

Circular photodetector 24 detects pits in that in the absence of a pit approximately 9% of the light strikes the photodetector, whereas, when a pit is present, interference ideally prevents any light at all from striking it. The signal PS that represents the data stored in pit forms in the recording medium can accordingly be obtained at the output terminal of amplifier 26.

Figure 4:
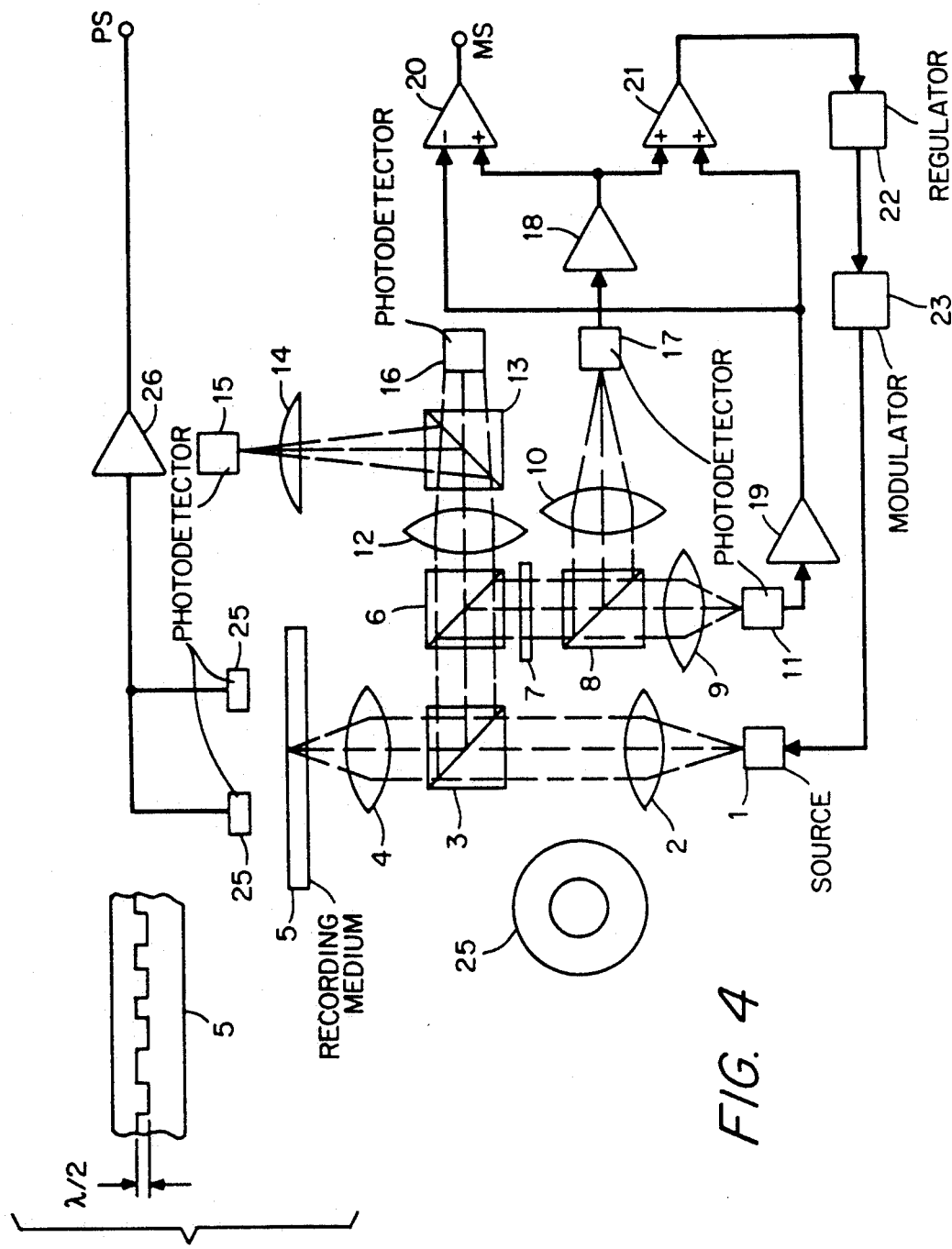
FIG. 4 illustrates schematically a fourth embodiment of the invention.

The fourth embodiment of the invention, illustrated in FIG. 4 has a photodetector 25 in the shape of a ring for example instead of a circular photodetector.

The signal PS that represents the data stored in pit forms in the recording medium is available at the output terminal of amplifier 26.

Figure 5:
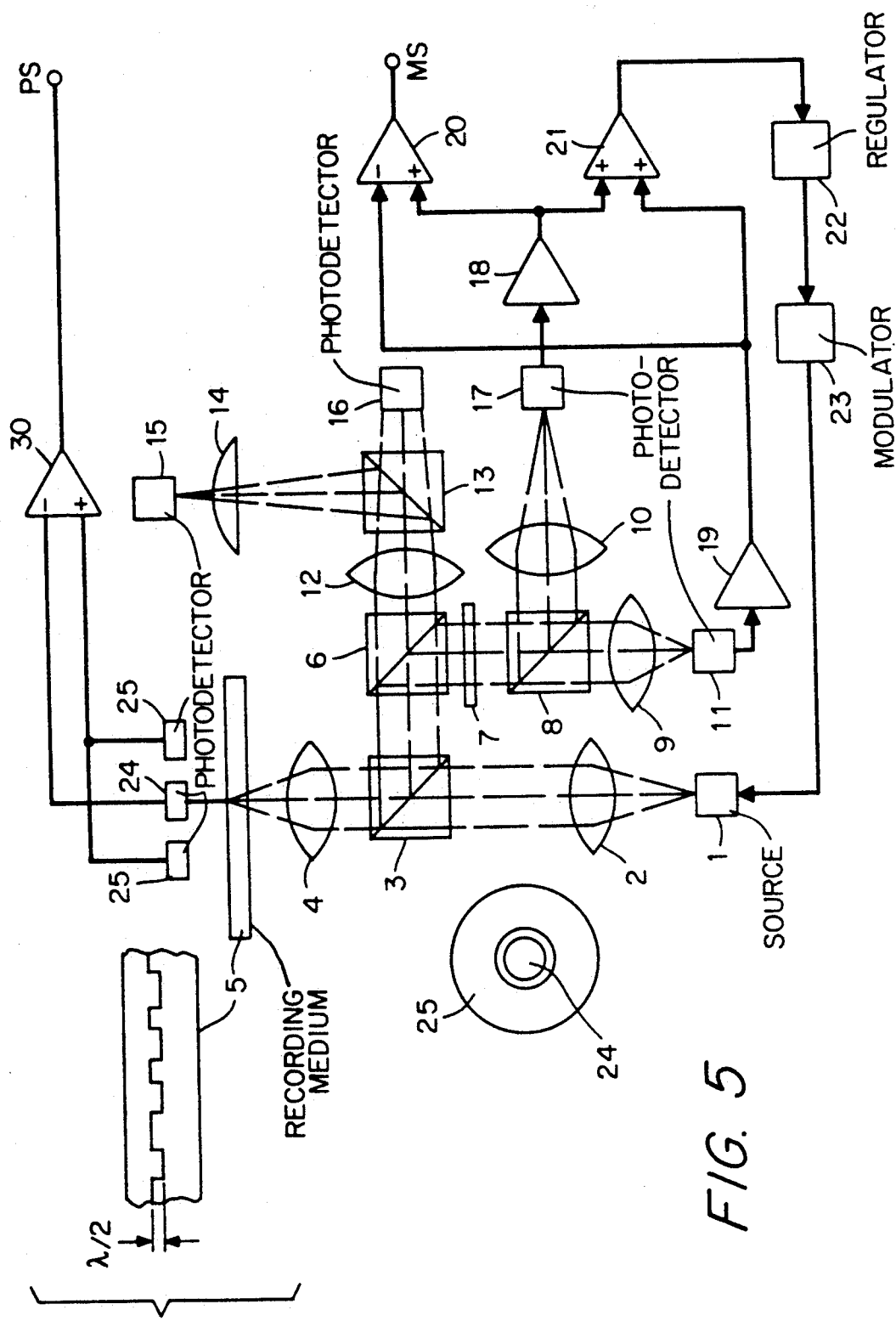
FIG. 5 illustrates schematically a fifth embodiment of the invention.

Finally, it is also possible as in the fifth embodiment illustrated in FIG. 5, to combine both photodetector 24 and photodetector 25, with the circular photodetector 24 surrounded by annular photodetector 25. Photodetector 24 detects the unrefracted beams of light and photodetector 25 the beams that are refracted to the first order. The output terminal of circular photodetector 24 is connected to the subtracting input terminal of a differential amplifier 30 and the output terminal of annular photodetector 25 with the adding input terminal of the same amplifier. Since the signals from the two photodetectors always have different mathematical signs, the difference between the two signals that appears at the output terminal of differential amplifier 30 represents the data stored in pit forms in recording medium 5.

Summation amplifier 21, controls 22, and modulator 23 can be eliminated from the embodiments illustrated in FIGS. 3, 4, and 5. There is, however, instead of modulator 23 a laser drive to control the laser.

Figure 6:
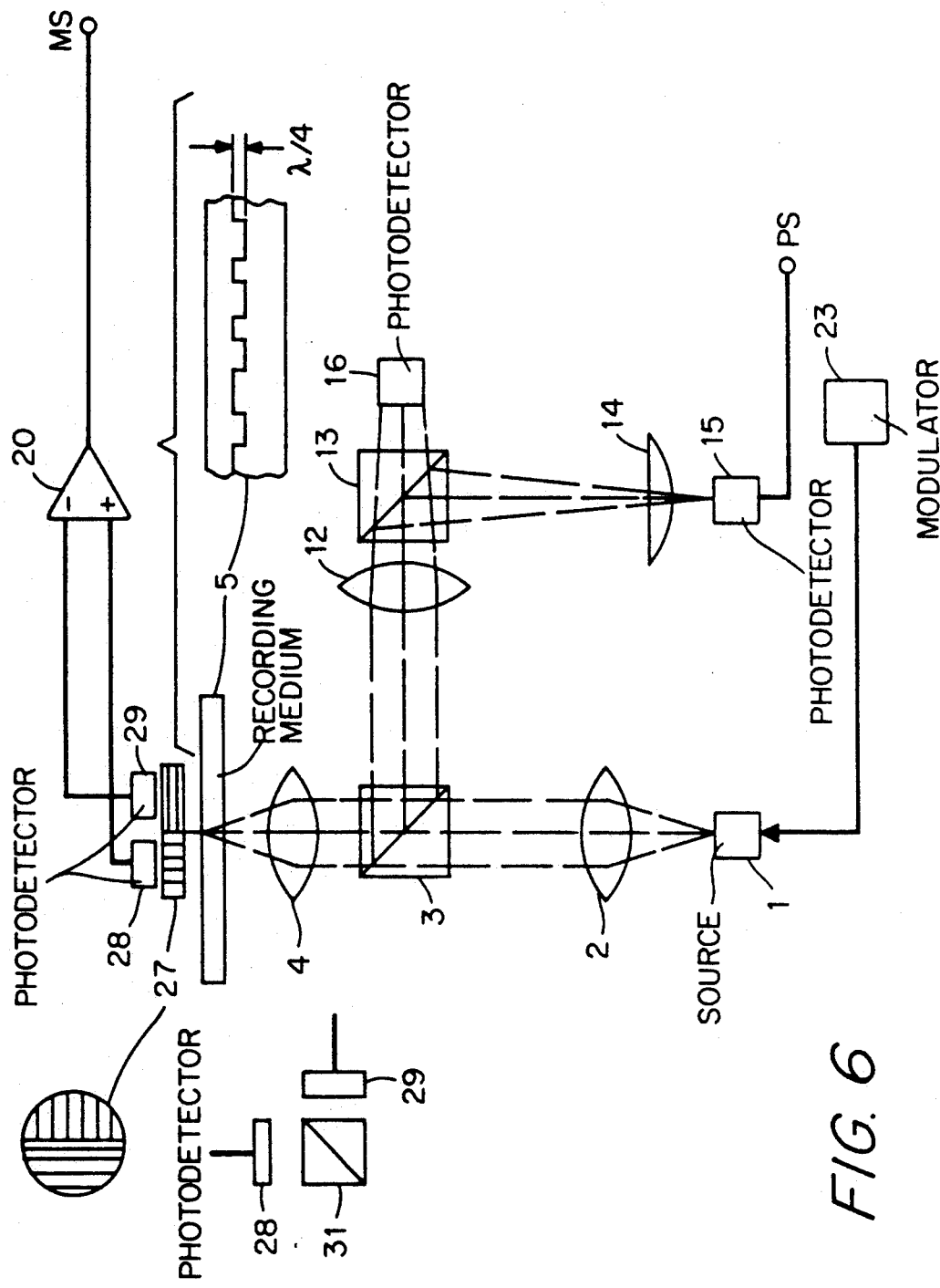
FIG. 6 illustrates schematically a sixth embodiment of the invention.

The sixth embodiment of the invention, illustrated in FIG. 6, will now be specified.

This embodiment reads data from a recording medium with pits having a depth equal to the dimension $\lambda/4$. The path difference is accordingly $\lambda/2$. The pits can also be any odd multiple of $\lambda/4$ deep. All that is essential is that the path difference between light reflected from a pit and the light reflected from a land in vicinity of the pit be $\lambda/2$ or $\lambda/2 + n\lambda$, where n is a whole number.

In contrast to the optomagnetic recording media previously described herein, the reflected light represents the pit data in this embodiment, whereas the penetrating light represents the data stored in the magnetic domains. It is not the Kerr effect, now, but the similar Faraday effect that is exploited to read the magnetically stored data.

In the embodiment illustrated in FIG. 6, the beam of light generated by laser 1, the light output of which is controlled by a laser drive 23, travels through a lens 2, a prism beam divider 3, and another lens 4 to a recorded medium 5. Some of the light emitted by laser 1 is reflected back through second lens 4 to first prism beam divider 3, which diverts a beam of light through still another lens 12 and still another prism beam divider 13 onto a photodetector 16. A tracking error TE for the tracking circuit is generated from the signals leaving photodetector 16. Prism beam divider 13, however, also diverts a beam through a fourth lens 14 and onto another photodetector 15, which can be in the shape of a large square comprising four adjacent square photodiodes A, B, C, and D. A focusing error FE for the focusing circuit and the signal PS represents the pit data in the recording medium are obtained from the signals leaving second photodetector 15. Behind recording medium 5 is a polarizer 27, which can be a circular or square polarizing filter. One half of polarizing filter 27 transmits only the beams of light that are polarized in one plane and the other half only the beams with a plane of polarization rotated in the other direction. Behind one half of polarizing filter 27 is a photodetector 28 and behind the other half another photodetector 29. The two photodetectors are connected to the input terminals of a differential amplifier 20.

Polarizing filter 27 transmits more light onto either photodetector 28 or photodetector 29, depending on what direction the individual magnetic domains in recorded medium 5 ar magnetized in. The signal MS that represents the data stored in the magnetic domains of the recorded medium can accordingly be obtained at the output terminal of differential amplifier 20.

Figure 7:
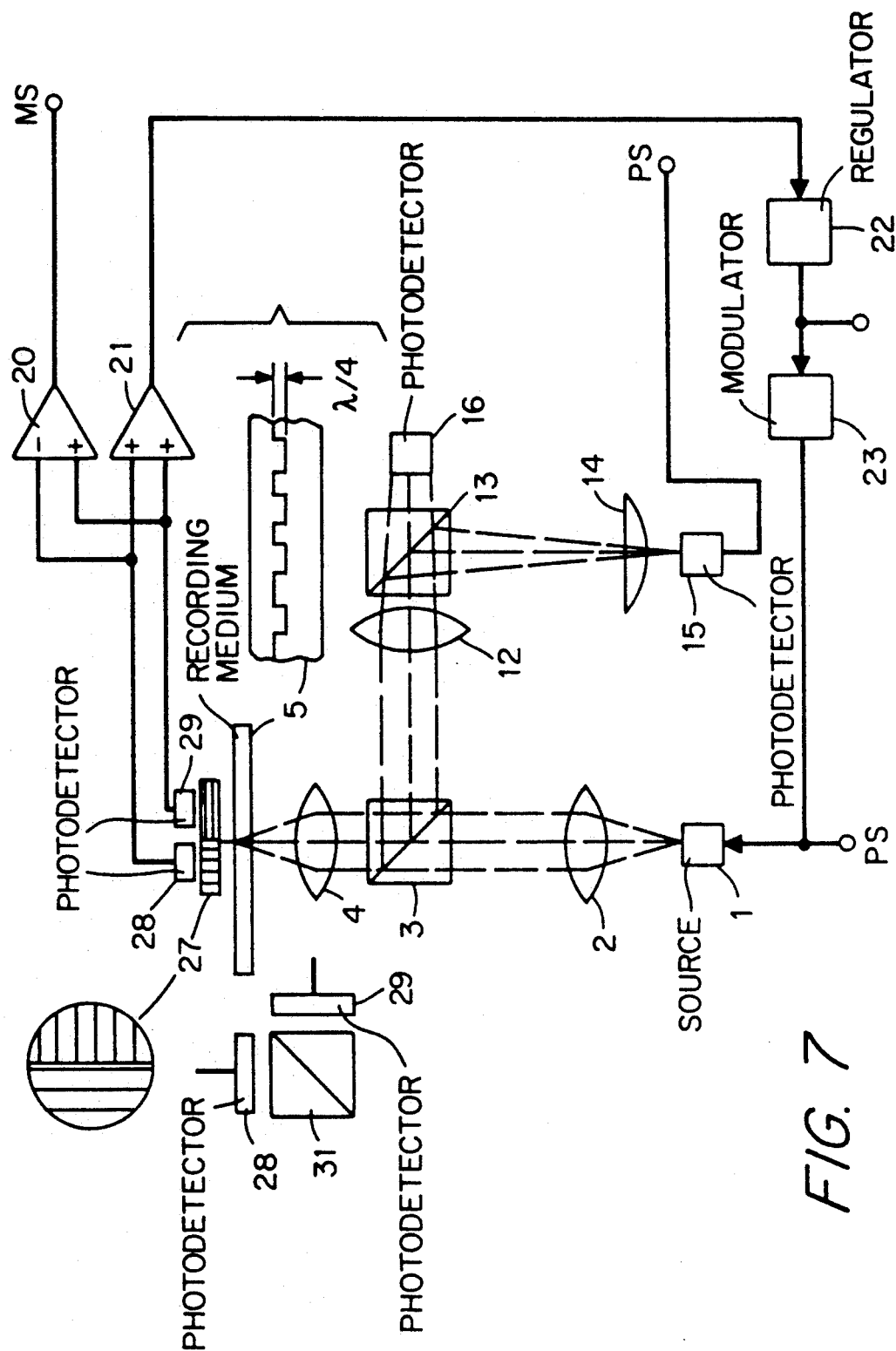
FIG. 7 illustrates schematically a seventh embodiment of the invention.

FIG. 7 illustrates another version of the embodiment illustrated in FIG. 6. This embodiment is expanded by means of a summation amplifier 21, controls 22, and a laser drive 23. The two photodetectors 27 and 28 are connected to the input terminals of summation amplifier 21, the output terminal of which is connected to the input terminal of controls 22. The output terminal of controls 22 is connected to the input terminal of laser drive 23, the output terminal of which is connected to the control input terminal of laser 1. The intensity of the light reflected from recording medium 5 is maintained constant in this embodiment as well as by laser drive 23. The signal PS that represents the pit data in the recording medium can accordingly be obtained at the output terminal of either controls 22 o laser drive 23. Data signal PS is also available, as in the embodiment previously discussed herein, at the output terminal of second photodetector 15.

A polarizing beam divider 31 can be employed instead of polarizing filter 27, diverting the light with a polarization component rotated in one direction to photodetector 28 and the light with a polarization component in the other direction to photodetector 29.

Although less light is lost through a polarizing beam divider than through a polarizing filter, a filter costs less than a beam divider. A simple filter also takes up less room than a beam divider.

All of the embodiments wherein the intensity of the light reflected from the recording medium is maintained at a constant level can also have an additional photodetector to receive the light reflected from the medium and forward its output signal to modulator 23 to modulate laser 1. It is, however, also possible to exploit the laser's monitor diode for this purpose. In this embodiment it is the signal leaving the monitor that modulates the laser.

The optical pick-up in accordance with the invention can read both the data stored in the magnetic domains and the pit data in the new type of recording medium. It is even possible to simultaneously read the pit data and write data into the magnetic domains. A conventional compact disk or optomagnetic disk can also be read by the optical pick-up in accordance with the invention.

Although the invention is especially appropriate for data processing because data can simultaneously be stored and read, the invention offers the advantage in relation to compact-disk players and videodisk players that both sound and pictures can be picked up simultaneously during playback. One essential advantage of the new type of recorded medium, which is a combination ROM and RAM disk, is that its storage capacity is twice that of either a ROM or a RAM disk, a compact disk or an optomagnetic disk.

We claim:

1. An optical pickup for reading information from a magneto-optical recording medium having stored data magnetic domains and stored optical pits superimposed thereon, said medium being free of surfaces with a periodic wave-shaped pattern which does not store information, said optical pickup comprising: a light source projecting a light beam on said medium, said light beam scanning simultaneously said magnetic domains and said stored pits; beam splitting means for splitting a light beam reflected from said medium into first and second splitted light beams; first and second photodetectors receiving said first and second beams, respectively, and having output photovoltages; differentiating means responsive to said first and second photodetectors for generating a magneto-optical recording signal representing said stored magnetic domains; summing means with inputs connected to inputs of said differentiating means and thereby also responsive to said first and second photodetectors; regulating means connected between an output of said summing means and said light source for providing a regulating signal to regulate an intensity of said light beam reflected from said medium to be at a constant value, said differentiating means having an output for providing said magneto-optical recording signal representing data read out from said stored magnetic domains, said regulating means having an output simultaneously with the output of said differentiating means and providing a signal representing data read out from said stored pits, the output of said regulating means regulating the intensity of said light beam dependent on the light reflected from the recording medium.

2. The optical pickup as defined in claim 1, wherein said regulating means includes means for modulating said projected light beam in response to said output of said summing means.

3. An optical pickup for reading information from a magneto-optical recording medium having stored data magnetic domains and stored optical pits superimposed thereon, said medium being free of surfaces with a periodic wave-shaped pattern which does not store information, said optical pickup comprising: a light source projecting a light beam on said medium, said light beam scanning simultaneously said magnetic domains and said stored pits; beam splitting means for splitting a light beam reflected from said medium into first and second splitted light beams; first and second photodetectors receiving said first and second beams, respectively, and having output photovoltages; differentiating means responsive to said first and second photodetectors for generating a magneto-optical recording signal representing said stored magnetic domains; summing means with inputs connected to inputs of said differentiating means and thereby also responsive to said first and second photodetectors; regulating means connected between an output of said summing means and said light source for providing a regulating signal to regulate an intensity of said light beam reflected from said medium to be at a constant value, said differentiating means having an output for providing said magneto-optical recording signal representing data read out from said stored magnetic domains, said regulating means having an output simultaneously with the output of said differentiating means and providing a signal representing data read out from said stored pits, the output of said regulating means regulating the intensity of said light beam dependent on the light reflected from the recording medium; said summing means comprising a summing amplifier for producing a sum of said photovoltages and having an output connected to an input of said regulating means; said regulating means modulating said sum of said photovoltages; and applying a modulated regulating signal to said light source.

4. An optical pickup for reading information from a magneto-optical recording medium having stored data magnetic domains and stored optical pits superimposed thereon, said medium being free of surfaces with a periodic wave-shaped pattern which does not store information, said optical pickup comprising: a light source projecting a light beam on said medium, said light beam scanning simultaneously said magnetic domains and said stored pits; beam splitting means for splitting a light beam reflected from said medium into first and second splitted light beams; first and second photodetectors receiving said first and second beams, respectively, and having output photovoltages; differentiating means responsive to said first and second photodetectors for generating a magneto-optical recording signal representing said stored magnetic domains; summing means with inputs connected to inputs of said differentiating means and thereby also responsive to said first and second photodetectors; regulating means connected between an output of said summing means and said light source for providing a regulating signal to regulate an intensity of said light beam reflected from said medium to be at a constant value, said differentiating means having an output for providing said magneto-optical recording signal representing data read out from said stored magnetic domains, said regulating means having an output simultaneously with the output of said differentiating means and providing a signal representing data read out from said stored pits, the output of said regulating means regulating the intensity of said light beam dependent on the light reflected from the recording medium; and means responsive to said regulating means and connected to said light source for modulating said regulating signal and applying a modulated regulating signal to said light source.

* * * * *